(12) United States Patent
Li et al.

(10) Patent No.: US 11,336,965 B2
(45) Date of Patent: May 17, 2022

(54) METHOD AND APPARATUS FOR PROCESSING VIDEO BITSTREAM, NETWORK DEVICE, AND READABLE STORAGE MEDIUM

(71) Applicant: Xi'an Zhongxing New Software Co., Ltd., Shaanxi (CN)

(72) Inventors: Ming Li, Shenzhen (CN); Zhao Wu, Shenzhen (CN); Ping Wu, Shenzhen (CN); Xiaoquan Hua, Shenzhen (CN)

(73) Assignee: Xi'An Zhongxing New Software Co., Ltd., Shaanxi (CN)

( * ) Notice: Subject to any disclaimer, the term of this patent is extended or adjusted under 35 U.S.C. 154(b) by 0 days.

(21) Appl. No.: 16/958,644

(22) PCT Filed: Dec. 6, 2018

(86) PCT No.: PCT/CN2018/119517
§ 371 (c)(1),
(2) Date: Jun. 26, 2020

(87) PCT Pub. No.: WO2019/128668
PCT Pub. Date: Jul. 4, 2019

(65) Prior Publication Data
US 2021/0067834 A1    Mar. 4, 2021

(30) Foreign Application Priority Data
Dec. 26, 2017    (CN) .......................... 201711433126.8

(51) Int. Cl.
*H04N 21/4728*    (2011.01)
*H04N 19/174*    (2014.01)
(Continued)

(52) U.S. Cl.
CPC ....... *H04N 21/4728* (2013.01); *H04N 19/174* (2014.11); *H04N 19/187* (2014.11);
(Continued)

(58) Field of Classification Search
CPC .......... H04N 21/4728; H04N 21/2343; H04N 21/2662; H04N 19/174; H04N 19/187; H04N 19/30; H04N 19/70
(Continued)

(56) References Cited

U.S. PATENT DOCUMENTS 9,083,944 B2   7/2015   Kobayashi et al.
9,351,009 B2   5/2016   Deshpande
(Continued)

FOREIGN PATENT DOCUMENTS

CN    103609112    2/2014
CN    104718746    6/2015
(Continued)

OTHER PUBLICATIONS

International Search Report of Application No. PCT/CN2018/119517—6 pages (dated Feb. 27, 2019).
(Continued)

*Primary Examiner* — Allen C Wong
(74) *Attorney, Agent, or Firm* — Knobbe, Martens, Olson & Bear LLP

(57) ABSTRACT

Provided are a method and apparatus for processing a video bitstream, a network device and a readable storage medium. The method includes: parsing a bitstream to be extracted, and acquiring parameter information about an extractable sub-bitstream from a data unit of the bitstream to be extracted; determining a picture type parameter value of a random access picture in the sub-bitstream according to the parameter information; and configuring, in a process of extracting the sub-bitstream from the bitstream to be extracted, a picture type parameter value in a data unit of the sub-bitstream according to the picture type parameter value of the random access picture.

18 Claims, 2 Drawing Sheets

(51) Int. Cl.
*H04N 19/187* (2014.01)
*H04N 19/30* (2014.01)
*H04N 19/70* (2014.01)
*H04N 21/2343* (2011.01)
*H04N 21/2662* (2011.01)

(52) U.S. Cl.
CPC ............ *H04N 19/30* (2014.11); *H04N 19/70* (2014.11); *H04N 21/2343* (2013.01); *H04N 21/2662* (2013.01)

(58) Field of Classification Search
USPC .................................................... 375/240.01
See application file for complete search history.

(56) References Cited

U.S. PATENT DOCUMENTS

| | | | |
|---|---|---|---|
| 9,525,883 | B2 | 12/2016 | Wang et al. |
| 10,085,033 | B2 | 9/2018 | Maeda et al. |
| 10,104,390 | B2 | 10/2018 | Deshpande |
| 10,136,150 | B2 | 11/2018 | Ugur et al. |
| 2009/0232199 | A1 | 9/2009 | Kobayashi et al. |
| 2013/0222537 | A1* | 8/2013 | Chen ............... H04N 21/816 348/43 |
| 2014/0219346 | A1 | 8/2014 | Ugur et al. |
| 2014/0301452 | A1 | 10/2014 | Deshpande |
| 2015/0016546 | A1 | 1/2015 | Wang et al. |
| 2015/0264404 | A1 | 9/2015 | Hannuksela |
| 2016/0150236 | A1 | 5/2016 | Maeda et al. |
| 2016/0156917 | A1 | 6/2016 | Ugur et al. |
| 2016/0191938 | A1 | 6/2016 | Deshpande |
| 2016/0241866 | A1 | 8/2016 | Kang et al. |
| 2018/0367807 | A1 | 12/2018 | Maeda et al. |
| 2019/0020884 | A1* | 1/2019 | Skupin ................ H04N 19/174 |

FOREIGN PATENT DOCUMENTS

| | | |
|---|---|---|
| CN | 105027567 A | 11/2015 |
| CN | 105052156 | 11/2015 |
| CN | 105379271 A | 3/2016 |
| CN | 105379274 A | 3/2016 |
| CN | 105516729 | 4/2016 |
| CN | 105519118 A | 4/2016 |
| CN | 106162194 | 11/2016 |
| CN | 106464891 | 2/2017 |
| CN | 106464891 A | 2/2017 |
| EP | 3120552 | 1/2017 |
| WO | WO 2015 140391 | 9/2015 |
| WO | WO 2017 137444 | 8/2017 |

OTHER PUBLICATIONS

Choi, et al., "On Random access point for MV-HEVC and other HEVC extension", Samsung Electronics Co., Ltd. Apr. 2013. 5 pages.
Wu, et al., "Motion-constrained tile sets SEI message", Microsoft Corporation, Apr. 2013. 4 pages.
Extended European Search Report dated Jul. 28, 2021 for European Patent Application No. 18893476.4. 8 pages.
Chinese Office Action dated Jan. 5, 2021, for Chinese Application No. 201711433126.8.
Chinese Office Action dated Jul. 16, 2021, for Chinese Application No. 201711433126.8.
Chinese Search Report dated Dec. 26, 2017 for Chinese Patent Application No. 2017114331268.
Chinese Supplementary Search Report dated Dec. 26, 2017 for Chinese Patent Application No. 2017114331268.

* cited by examiner

METHOD AND APPARATUS FOR PROCESSING VIDEO BITSTREAM, NETWORK DEVICE, AND READABLE STORAGE MEDIUM

CROSS-REFERENCE TO RELATED APPLICATIONS

This is a National Stage Application, filed under 35 U.S.C. 371, of International Patent Application No. PCT/CN2018/119517, filed on Dec. 6, 2018, which claims the priority of Chinese patent application No. 201711433126.8 filed on Dec. 26, 2017, contents of both of which are incorporated herein by reference in their entireties.

TECHNICAL FIELD

The present disclosure relates to the fields of video processing and communication, and in particular relates to a method and apparatus for processing a video bitstream, a network device, and a readable storage medium.

BACKGROUND

In a video bitstream, an identification information field is usually configured for an entire picture to identify whether the picture may provide a random access function. When a sub-bitstream is acquired by a bitstream extraction on a bitstream corresponding to the picture, and if the picture is a random access picture, a picture corresponding to the sub-bitstream is also a random access picture, so that for the sub-bitstream acquired by the bitstream extraction on the picture of the entire video bitstream, a random access operation on the sub-bitstream may be achieved from the picture.

Since, in the existing art, the method for configuring the identification information field on the entire picture is adopted to identify whether the picture may provide the random access function. Therefore. in a process of the bitstream extraction, a random access picture included in the sub-bitstream may be determined on a video bitstream layer when the identification information field is acquired, which will bring drawbacks described below.

In order to increase a random access point of a sub-bitstream corresponding to a region with a relatively high attention, it is necessary to add random access points to the entire video bitstream, thus increasing an overall coding overhead of the video bitstream and further increasing the processing complexity of network transmission and server scheduling.

A user must wait for a random access picture of the video bitstream to access an attention region, and an access delay of the user is increased. For example, for an application of live broadcast of sport events, even if the user chooses to watch contents inside a stadium, the user still need to wait for the random access picture of the video bitstream, so that a terminal device may correctly extract a sub-bitstream of a related region inside the stadium in the picture bitstream.

When a network transmission bandwidth is reduced or a terminal buffer is full, the terminal cannot access the entire video bitstream in a manner of successively accessing sub-bitstreams corresponding to different regions in order to present a complete high-resolution video picture for the user.

SUMMARY

The present disclosure provides a method and apparatus for processing a video bitstream, a network device and a readable storage medium.

A method for processing a video bitstream is provided in the present disclosure and includes steps described below. A bitstream to be extracted is parsed, and parameter information about an extractable sub-bitstream is acquired from a data unit of the bitstream to be extracted; a picture type parameter value of a random access picture in the sub-bitstream is determined according to the parameter information; and in a process of extracting the sub-bitstream from the bitstream to be extracted, a picture type parameter value in a data unit of the sub-bitstream is configured according to the picture type parameter value of the random access picture.

An apparatus for processing a video bitstream is further provided in the present disclosure and includes: a bitstream parsing module, a parameter determination module and a parameter configuration module. The bitstream parsing module is configured to parse a bitstream to be extracted, and acquire parameter information about an extractable sub-bitstream from a data unit of the bitstream to be extracted; the parameter determination module is configured to determine a picture type parameter value of a random access picture in the sub-bitstream according the parameter information; and the parameter configuration module is configured to configure, in a process of extracting the sub-bitstream from the bitstream to be extracted, a picture type parameter value in a data unit of the sub-bitstream according to the picture type parameter value of the random access picture.

A network device is further provided in the present disclosure and includes a processor, a memory and a communication bus. The communication bus is configured to implement a connection communication between the processor and the memory; and the processor is configured to execute programs for processing a video bitstream, which are stored in the memory, to perform steps of the above-mentioned method for processing the video bitstream.

The present disclosure further provide a computer-readable storage medium. The computer-readable storage medium is configured to store at least one program, where the at least one program is executable by at least one processor to implement the above-mentioned method for processing the video bitstream.

DETAILED DESCRIPTION

To illustrate the objects, technical schemes and advantages of the present disclosure clearer, the embodiments of the present disclosure will be described below in detail in conjunction with the embodiments and drawings. It is to be understood that the embodiments described herein are intended to explain and not to limit the present disclosure.

First Embodiment

Figure 1:
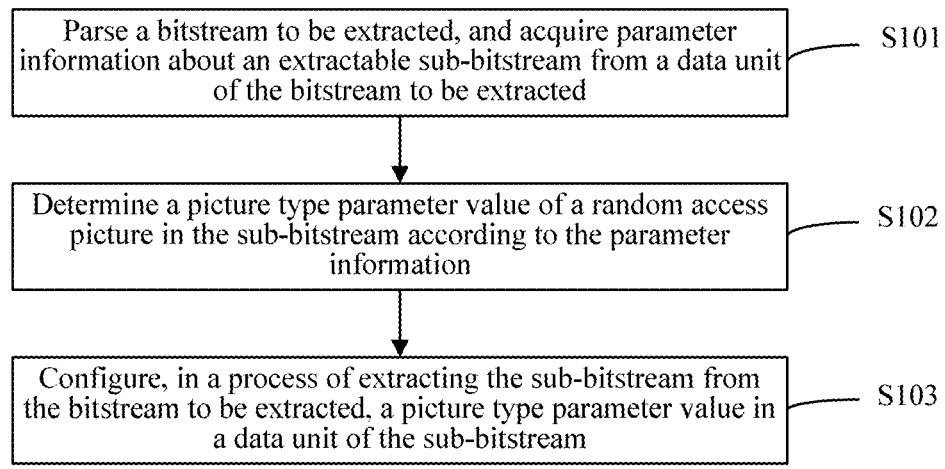
FIG. 1 is a flowchart of a method for processing a video bitstream according to a first embodiment of the present disclosure.

Referring to FIG. 1, FIG. 1 is a flowchart of a method for processing a video bitstream according to the first embodiment of the present disclosure. The method for processing the video bitstream includes steps described below. In step S101, a bitstream to be extracted is parsed, and parameter information about an extractable sub-bitstream is acquired from a data unit of the bitstream to be extracted. In step S102, a picture type parameter value of a random access picture in the sub-bitstream is determined according to the parameter information. In step S103, in a process of extracting the sub-bitstream from the bitstream to be extracted, a picture type parameter value in a data unit of the sub-bitstream is configured according to the picture type parameter value of the random access picture.

In a stream media application, one video bitstream with a high-resolution picture may extract one or more bitstreams with different resolutions, which may be adapted to terminal devices with different decoding capabilities and a variety of different application scenarios, such as an interactive ultra-high definition television, and a dynamic interactive on-demand, etc. For applications using a panoramic video or a 360-degree video, a server may dynamically send a sub-bitstream including a user-specified viewing content and acquired from an entire bitstream to a terminal user according to user viewing requirements provided by a terminal. In an implementation method, the server may extract a corresponding sub-bitstream from the entire bitstream in real time according to the user viewing requirements provided by the terminal; or the server may also extract the sub-bitstream from the entire bitstream in advance, and dynamically select and send the corresponding sub-bitstream according to the user viewing requirements provided by the terminal.

In order to provide a random access function, the video bitstream will include a picture capable for performing a random access. A decoding process of a random access picture does not need to refer to decoded information of other pictures other than the random access picture. In this way, starting from the random access picture, a decoder may correctly decode a bitstream corresponding to a picture and its subsequent pictures according to a decoding sequence without any information of a bitstream before this picture. However, a coding bit overhead of the random access picture is much larger than that of a picture that needs to use decoded information of other pictures in the decoding process.

In a practical application, a high-resolution video, a panoramic video and a 360-degree video usually include abundant scene information, and attention degrees of the user devoting to different scene contents are greatly different, therefore, for a sub-bitstream including a region with a relatively high attention degree, it is often necessary to provide a relatively dense random access picture to facilitate users to access and view. For example, for the application of live broadcast of sport events, during an event, a user pays more attention to picture regions inside the stadium in the video picture, and pays less attention to picture regions of audiences. In this way, for a sub-bitstream including a picture region inside the stadium, it is necessary to be able to provide the user with more dense random access pictures compared with a picture region of audiences, so as to facilitate the user to access a live broadcast bitstream in time.

In the step S101, the bitstream to be extracted is parsed, and the parameter information about the extractable sub-bitstream is acquired from the data unit of the bitstream to be extracted. Where, the bitstream to be extracted indicates that the server, the user or an intermediate device needs to extract an entire bitstream of the sub-bitstream from the bitstream to be extracted, or extract a sub-bitstream of a next level sub-bitstream from the bitstream to be extracted. The bitstream to be extracted is a source of the sub-bitstream, and the bitstream to be extracted may be bitstreams including the entire bitstream and that all may extract a next level sub-bitstream, that is, the sub-bitstream is a subset of the bitstream to be extracted. In the present embodiment, the bitstream includes the video bitstream, and the video bitstream may also be called a media bitstream or a media file, such as a media bitstream or media file of an H.265/high efficiency video coding (HEVC) standard, or a media bitstream or media file of an H.264/advanced video coding (AVC) standard, etc.

The bitstream to be extracted is parsed, and the parameter information about the extractable sub-bitstream is acquired from the data unit of the bitstream to be extracted, where the data unit of the bitstream to be extracted may include an auxiliary information unit included in a transport stream and/or a media file format, a data unit in the transport stream and/or in the media file format that indicates a division manner of picture regions, a network abstraction layer (NAL) unit header, a parameter set, a sequence header, a picture header, a slice header, an auxiliary information unit of the video bitstream (such as supplemental enhancement information (SEI)) and video usability information (VUI)), etc. These data units, which may also be called as system layer data units, may all provide the parameter information about the extractable sub-bitstream required in the present embodiment.

Exemplarily, the parameter information may be used for indicating one or more sub-bitstreams that may be extracted from the bitstream. The parameter information indicates a location of a decoded picture corresponding to the sub-bitstream in the high-resolution picture obtained by decoding the bitstream. The parameter information may further include decoder capability information required by decoding the sub-bitstream, such as a level value corresponding to the sub-bitstream.

In particular, the parameter information includes random access picture information for indicating the sub-bitstream. For example, an implementation method is that the parameter information indicates whether a picture corresponding to a data unit, which is extracted into the sub-bitstream, among data units related to the data unit where the parameter information is located in the bitstream is the random access picture. The parameter information may indicate whether the picture in the sub-bitstream is the random access picture, if yes, the parameter information may further indicate a type of the random access picture.

In the step S102, the picture type parameter value of the random access picture in the sub-bitstream is determined according to the parameter information. Exemplarily, determining the picture type parameter value of the random access picture in the sub-bitstream may include at least one of: when the parameter information includes picture type information of the random access picture in the bitstream, a value of the picture type information is served as the picture type parameter value of the random access picture; when the parameter information includes information about an access point related to a random access, a picture type parameter value of a picture corresponding to the access point is determined, and the picture type parameter value of the picture corresponding to the access point is served as the picture type parameter value of the random access picture;

or when the parameter information includes information about a random access picture location, picture type information of the random access picture is determined according to a bitstream feature of the sub-bitstream at the random access picture location, and a value of the picture type information of the random access picture is served as the picture type parameter value of the random access picture.

The above-mentioned three manners denote that when the parameter information has included the picture type information of the random access picture in the sub-bitstream, the value of the picture type information may be directly served as the picture type parameter value of the random access picture.

In addition, further according to information related to the random access in the bitstream, such as information about the access point, the picture type parameter value of the random access picture is determined according to the picture type parameter value of the picture corresponding to the access point, that is, the picture type parameter value of the access point is served as the picture type parameter value of the random access picture. Exemplarily, in the present embodiment, the access point may include a recovery point, and the information about the access point is also information about the recovery point correspondingly. When the bitstream includes the information about the recovery point, and if the information about the recovery point indicates that a location of the bitstream or a location of the sub-bitstream which is related to the information about the recovery point is a recovery point, a picture of the sub-bitstream is a random access picture. If the recovery point further includes the picture type information of the random access picture, a random access picture type of the picture in the sub-bitstream is configured as a picture type indicated by the recovery point.

The step in which when the parameter information includes the information about the access point related to the random access, the picture type parameter value of the picture corresponding to the access point is determined may include steps described below. When the information about the access point includes picture type information, a value of the picture type information is served as the picture type parameter value of the picture corresponding to the access point; and when the information about the access point does not include the picture type information, a bitstream feature of the sub-bitstream at a location of the access point is analyzed, picture type information of the picture corresponding to the access point is determined, and a value of the picture type information of the picture corresponding to the access point is served as the picture type parameter value of the picture corresponding to the access point.

In addition, the picture type information of the random access picture is further determined according to a bitstream feature of the sub-bitstream where the random access picture is located, and a value of the picture type information is served as the picture type parameter value of the random access picture. This scheme may be served as a general method for determining a type of the random access picture, and may also be served as a method for processing a case where no explicitly identified picture type information is acquired from the bitstream in a process of parsing the bitstream. For example, in a case where neither the parameter information nor the information about the recovery point provides the picture type information, the present scheme may be used in combination with the above-mentioned two methods. By analyzing a bitstream at the location of the random access picture in the sub-bitstream, since the type of the random access picture describes the bitstream feature of the sub-bitstream, the type of the random access picture may be inferred according to the bitstream feature, and the type of the random access picture is configured as the random access picture type of the picture in the sub-bitstream. The bitstream feature related to the random access picture type may include at least one of: an operation performed on a serial number that identifies a broadcasting sequence of pictures (e.g., a clear operation, a clear operation on a high bit and a clear operation on a low bit), an operation performed on a serial number that identifies a decoding sequence of the pictures, an operation performed on a buffer of a decoded picture (e.g., an empty operation, a picture output operation, etc.), and whether a decoding process of a picture, which has a decoding sequence after the random access picture but a broadcasting sequence before the random access picture, needs to use a picture with a decoding sequence before the random access picture.

Alternatively, an identification field in the parameter information may directly indicate the picture type, and the picture type parameter value may be directly determined according to the information about the picture type. At this moment, whether the picture is the random access picture is directly determined according to the picture type.

Parameter information for performing the bitstream extraction on the sub-bitstream is further configured in the data unit of the sub-bitstream. The bitstream extraction may be based not only on the entire bitstream, but also on the sub-bitstream extracted from the entire bitstream, as long as the extracted sub-bitstream supports a further extraction. If the extraction is performed on the sub-bitstream, parameter information about a next level sub-bitstream may be configured in the data unit of the sub-bitstream.

The step S103 in which the picture type parameter value in the data unit of the sub-bitstream is configured according to the picture type parameter value of the random access picture in the process of extracting the sub-bitstream from the bitstream to be extracted includes a step described below. At least one of a data unit type field value in a data unit included in the sub-bitstream or a picture type field value included in the data unit is configured as the picture type parameter value in the data unit of the sub-bitstream.

In the process of extracting the sub-bitstream, it is necessary to ensure that the extracted sub-bitstream conforms requirements of the coding standard and/or transport stream standard and the media file standard, therefore it is necessary to re-configure a field in the sub-bitstream in the extraction process. For example, in the extraction process, it is necessary to replace a parameter set of the bitstream with a parameter set of the sub-bitstream. The picture type field of the random access picture in the sub-bitstream may be located at one or more following data units, which include a descriptor in a transport stream and/or a media file format, an auxiliary information unit included in the transport stream and/or in the media file format, a data unit, which is used for indicating the division manner of the picture regions, in the transport stream and/or in the media file format, the network abstraction layer unit header, the parameter set, the sequence header, the picture header, the slice header, and the auxiliary information unit of the video bitstream (such as the supplemental enhancement information).

In the present embodiment, the parameter information about the extractable sub-bitstream is acquired from the data unit of the bitstream to be extracted by using the H.265/HEVC standard and at least one of following manners: parsing an extraction information set with an index serial number of i in the data unit of the bitstream to be extracted, and configuring pictures for composing the sub-bitstream in bitstream extraction, which are in the sub-bitstream and composed by picture regions corresponding to motion-constrained tile sets using the extraction information set with the index serial number of i, to have a same picture type; parsing an extraction information set with an index serial number of i in the data unit of the bitstream to be extracted, and configuring pictures for composing the sub-bitstream in bitstream extraction, which are in the sub-bitstream and composed by picture regions corresponding to a $j^{th}$ motion-constrained tile set using the extraction information set with the index serial number of i, to have a same picture type; parsing identification information in the data unit of the bitstream to be extracted, and configuring a picture type corresponding to an intra random access point (RAP) access unit as an RAP picture, where the identification information is used for indicating whether an access unit where a picture of the extracted sub-bitstream is located is the TRAP access unit; parsing the identification information in the data unit of the bitstream to be extracted, and parsing, for an TRAP access unit, an RAP picture type included in the TRAP access unit, where the identification information is used for indicating whether the access unit where the picture of the extracted sub-bitstream is located is the TRAP access unit; parsing a picture type in the data unit of the bitstream to be extracted, where the picture type is used for indicating a picture in an access unit where a picture of the extracted sub-bitstream is located; or parsing identification information in the data unit of the bitstream to be extracted, and parsing, for a recovery point, random access information included in the recovery point, where the identification information is used for indicating whether an access unit where the extracted sub-bitstream is located is the recovery point.

Alternatively, in the present embodiment, the parameter information about the extractable sub-bitstream is acquired from the data unit of the bitstream to be extracted by using the H.264/AVC standard and at least one of following manners: parsing an extraction information set with an index serial number of i in the data unit of the bitstream to be extracted, and configuring pictures for composing the sub-bitstream in the bitstream extraction, which are in the sub-bitstream and composed by picture regions corresponding to motion constrained slice group sets using the extraction information set with the index serial number of i, to have a same picture type; parsing an extraction information set with an index serial number of i in the data unit of the bitstream to be extracted, and configuring pictures for composing the sub-bitstream in the bitstream extraction, which are in the sub-bitstream and composed by picture regions corresponding to a $j^{th}$ motion constrained slice group set using the extraction information set with the index serial number of i, to have a same picture type; parsing identification information in the data unit of the bitstream to be extracted, where the identification information is used for indicating whether a picture of the extracted sub-bitstream is an instantaneous decoding refresh (IDR) picture; or parsing identification information in the data unit of the bitstream to be extracted, and parsing, for a recovery point, random access information included in the recovery point, where the identification information is used for indicating whether an access unit where the extracted sub-bitstream is located is the recovery point.

In addition, in the present embodiment, the method may further include steps described below. System layer information about the bitstream to be extracted is parsed, and the parameter information about the extractable sub-bitstream is acquired.

The method for processing the video bitstream is provided in the present embodiment of the present disclosure, which is aimed at the large access delay and the slow encoding and decoding speed, and the method includes steps described below. The bitstream to be extracted is parsed, the parameter information about the extractable sub-bitstream is extracted from the data unit of the bitstream to be extracted; the picture type parameter value of the random access picture in the sub-bitstream is determined according to the parameter information; and the picture type parameter value in the data unit of the sub-bitstream is configured in the process of extracting the sub-bitstream from the bitstream to be extracted. Through the implementation of the present disclosure, the picture type parameter of the extracted sub-bitstream is configured with the picture type parameter value of the random access picture, thereby significantly improving the speed of the sub-bitstream extraction and the encoding and decoding speed.

Second Embodiment

Figure 2:
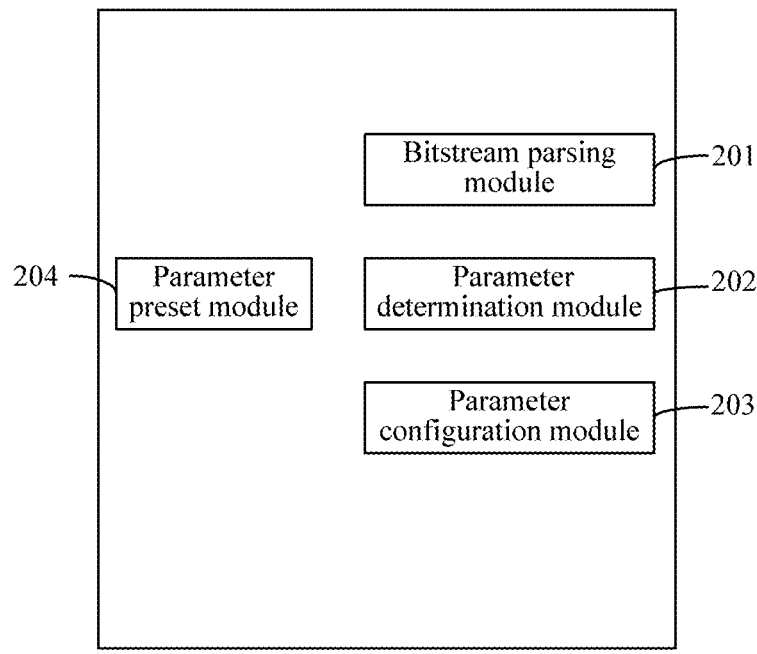
FIG. 2 is a schematic diagram illustrating composition of an apparatus for processing a video bitstream according to a second embodiment of the disclosure.

Referring to FIG. 2, FIG. 2 is a schematic diagram illustrating composition of an apparatus for processing a video bitstream according to the second embodiment of the present disclosure. The apparatus for processing the video bitstream includes a bitstream parsing module 201, a parameter determination module 202 and a parameter configuration module 203. The bitstream parsing module 201 is configured to parse a bitstream to be extracted, and acquire parameter information about an extractable sub-bitstream from a data unit of the bitstream to be extracted; the parameter determination module 202 is configured to determine a picture type parameter value of a random access picture in the sub-bitstream according to the parameter information; and the parameter configuration module 203 is configured to configure, in a process of extracting the sub-bitstream from the bitstream to be extracted, a picture type parameter value in a data unit of the sub-bitstream according to the picture type parameter value of the random access picture.

In the present embodiment, the bitstream parsing module 201 is configured to parse the bitstream to be extracted, and acquire the parameter information about the extractable sub-bitstream from the data unit of the bitstream to be extracted, where the bitstream to be extracted indicates that a server, a user or an intermediate device needs to extract an entire bitstream of the sub-bitstream from the bitstream to be extracted, or extract a sub-bitstream of a next level sub-bitstream from the bitstream to be extracted. The bitstream to be extracted is a source of the sub-bitstream, and the bitstream to be extracted may be bitstreams including the entire bitstream and that all may extract a next level sub-bitstream, that is, the sub-bitstream is a subset of the bitstream to be extracted. In the embodiment, the bitstream includes the video bitstream, which may also be called a media bitstream or a media file, such as a media bitstream or media file of an H.265/HEVC standard, or a media bitstream or media file of an H.264/AVC standard, etc.

The bitstream to be extracted is parsed, and the parameter information about the extractable sub-bitstream is acquired from the data unit of the bitstream to be extracted, where the data unit of the bitstream to be extracted may include an auxiliary information unit included in a transport stream and/or a media file format, a data unit in the transport stream and/or in the media file format that indicates a division manner of picture regions, a network abstraction layer unit header, a parameter set, a sequence header, a picture header, a slice header, an auxiliary information unit of the video bitstream (such as supplemental enhancement information and video usability information), etc. These data units, which may also be called system layer data units, may provide parameter information about the extractable sub-bitstream required in the present embodiment.

Exemplarily, the parameter information may be used for indicating one or more sub-bitstreams that may be extracted from the bitstream. The parameter information indicates a location of a decoded picture corresponding to the sub-bitstream in the high-resolution picture obtained by decoding the bitstream. The parameter information may also include decoder capability information required by decoding the sub-bitstream, such as a level value corresponding to the sub-bitstream.

In particular, the parameter information includes random access picture information for indicating the sub-bitstream. For example, an implementation method is that the parameter information indicates whether a picture corresponding to a data unit, which is extracted into the sub-bitstream, among data units related to the data unit where the parameter information is located in the bitstream is the random access picture. The parameter information may indicate whether the picture in the sub-bitstream is a random access picture, if yes, the parameter information may further indicate a type of the random access picture.

In the present embodiment, the parameter determination module 202 is configured to determine the picture type parameter value of the random access picture in the sub-bitstream according to the parameter information. Exemplarily, determining the picture type parameter value of the random access picture in the sub-bitstream may include at least one of: when the parameter information includes picture type information of the random access picture in the bitstream, a value of the picture type information is served as the picture type parameter value of the random access picture; when the parameter information includes information about an access point related to a random access, a picture type parameter value of a picture corresponding to the access point is determined, and the picture type parameter value of the picture corresponding to the access point is served as the picture type parameter value of the random access picture; or when the parameter information includes information about a random access picture location, picture type information of the random access picture is determined according to a bitstream feature of the sub-bitstream at the random access picture location, and a value of the picture type information of the random access picture is served as the picture type parameter value of the random access picture.

The above-mentioned three manners denote that when the parameter information has included the picture type information of the random access picture in the sub-bitstream, the value of the picture type information may be directly served as the picture type parameter value of the random access picture.

In addition, further according to information related to the random access in bitstream, such as information about the access point, the picture type parameter value of the random access picture is determined according to the picture type parameter value of the picture corresponding to the access point, that is, the picture type parameter value of the access point is served as the picture type parameter value of the random access picture. Exemplarily, in the present embodiment, the access point may include a recovery point, and the information about the access point is also correspondingly information about the recovery point. When the bitstream includes the information about the recovery point, and if the information about the recovery point indicates that a location of the bitstream or a location of the sub-bitstream related to the information about the recovery point is a recovery point, a picture of the sub-bitstream is the random access picture. If the recovery point further includes the picture type information of the random access picture, a random access picture type of the picture of the sub-bitstream is configured as a picture type indicated by the recovery point.

When the parameter information includes the information about the access point related to the random access, determining the picture type parameter value of the picture corresponding to the access point may include: when the information about the access point includes picture type information, a value of the picture type information is served as the picture type parameter value of the picture corresponding to the access point; and when the information about the access point does not include the picture type information, a bitstream feature of the sub-bitstream at a location of the access point is analyzed, picture type information of the picture corresponding to the access point is determined, and a value of the picture type information of the picture corresponding to the access point is served as the picture type parameter value of the picture corresponding to the access point.

In addition, the picture type information of the random access picture is further determined according to a bitstream feature of the sub-bitstream where the random access picture is located, and a value of the picture type information is served as the picture type parameter value of the random access picture. This scheme may be served as a general method for determining a type of the random access picture, and may also be served as a method for processing a case where no explicitly identified picture type information is acquired from the bitstream in a process of parsing the bitstream. For example, in a case where neither the parameter information nor information about the recovery point provides the picture type information, the present scheme may be used in combination with the above-mentioned two methods. By analyzing a bitstream at the location of the random access picture in the sub-bitstream, since the type of the random access picture describes the bitstream feature of the sub-bitstream, the type of the random access picture may be inferred according to the bitstream feature, and the type of the random access picture is configured as the random access picture type of the picture in the sub-bitstream. The bitstream feature related to the random access picture type may include at least one of: an operation performed on a serial number that identifies a broadcasting sequence of pictures (e.g., a clear operation, a clear operation on a high bit and a clear operation on a low bit), an operation performed on a serial number that identifies a decoding sequence of the pictures, an operation performed on a buffer of a decoded picture (e.g., an empty operation, a picture output operation, etc.), or whether a decoding process of a picture, which has a decoding sequence after the random access picture but a broadcasting sequence before the random access picture, needs to use a picture with a decoding sequence before the random access picture.

Alternatively, an identification field in the parameter information may directly indicate the picture type, and the picture type parameter value may be directly determined according to the information about the picture type. At this moment, whether the picture is the random access picture is directly determined according to the picture type.

The apparatus may further include a parameter preset module 204, which is configured to configure parameter information for performing bitstream extraction on the sub-bitstream in the data unit of the sub-bitstream. The bitstream extraction may be based not only on the entire cbitstream, but also on the sub-bitstream extracted from the entire bitstream, as long as the extracted sub-bitstream supports a further extraction. If the extraction is performed on the sub-bitstream, parameter information about a next level sub-bitstream may be configured in the data unit of the sub-bitstream.

In the present embodiment, the parameter configuration module 203 is configured to configure, in the process of extracting the sub-bitstream from the bitstream to be extracted, the picture type parameter value in the data unit of the sub-bitstream according to the picture type parameter value of the random access picture, which includes: at least one of a data unit type field value in a data unit included in the sub-bitstream or a picture type field value included in the data unit is configured as the picture type parameter value in the data unit of the sub-bitstream.

In the process of extracting the sub-bitstream, it is necessary to ensure that the extracted sub-bitstream conforms requirements of the coding standard and/or the transport stream standard and the media file standard, so it is necessary to re-configure a field in the sub-bitstream in the extraction process. For example, in the extraction process, it is necessary to replace a parameter set of the bitstream with a parameter set of the sub-bitstream. The picture type field of the random access picture in the sub-bitstream may be located at one or more following data units, and the one or more data units include a descriptor in the transport stream and/or in the media file format, an auxiliary information unit included in the transport stream and/or in the media file format, a data unit, which is used for indicating the division manner of the picture region, in the transport stream and/or in the media file format, the network abstraction layer unit header, the parameter set, the sequence header, the picture header, the slice header, and the auxiliary information unit of the video bitstream (such as the supplemental enhancement information).

In the present embodiment, the parameter information about the extractable sub-bitstream is acquired from the data unit of the bitstream to be extracted by using the H.265/HEVC standard and at least one of following manners: parsing an extraction information set with an index serial number of i in the data unit of the bitstream to be extracted, and configuring pictures for composing the sub-bitstream in bitstream extraction, which are in the sub-bitstream and composed by picture regions corresponding to motion-constrained tile sets using the extraction information set with the index serial number of i, to have a same picture type; parsing an extraction information set with an index serial number of i in the data unit of the bitstream to be extracted, and configuring pictures for composing the sub-bitstream in bitstream extraction, which are in the sub-bitstream and composed by picture regions corresponding to a $j^{th}$ motion-constrained tile set of the extraction information set with the index serial number of i, to have a same picture type; parsing identification information in the data unit of the bitstream to be extracted, and configuring a picture type corresponding to an IRAP access unit as an RAP picture, where the identification information is used for indicating whether an access unit where a picture of the extracted sub-bitstream is located is the IRAP access unit; parsing the identification information in the data unit of the bitstream to be extracted, and parsing, for an IRAP access unit, an IRAP picture type included in the IRAP access unit, where the identification information is used for indicating whether the access unit where the picture of the extracted sub-bitstream is located is the IRAP access unit; parsing a picture type in the data unit of the bitstream to be extracted, where the picture type is used for indicating a picture in an access unit where a picture of the extracted sub-bitstream is located; or parsing identification information in the data unit of the bitstream to be extracted, and parsing, for a recovery point, random access information included in the recovery point, where the identification information is used for indicating whether an access unit where the extracted sub-bitstream is located is the recovery point.

Alternatively, in the present embodiment, the parameter information about the extractable sub-bitstream is acquired from the data unit of the bitstream to be extracted by using the H.264/AVC standard and at least one of following manners: parsing an extraction information set with an index serial number of i in the data unit of the bitstream to be extracted, and configuring pictures for composing the sub-bitstream in the bitstream extraction, which are in the sub-bitstream and composed by picture regions corresponding to motion constrained slice group sets using the extraction information set with the index serial number of i, to have a same picture type; parsing an extraction information set with an index serial number of i in the data unit of the bitstream to be extracted, and configuring pictures for composing the sub-bitstream in the bitstream extraction, which are in the sub-bitstream and composed by picture regions corresponding to a $j^{th}$ motion constrained slice group set using the extraction information set with the index serial number of i, to have a same picture type; parsing identification information in the data unit of the bitstream to be extracted, where the identification information is used for indicating whether a picture of the extracted sub-bitstream is an IDR picture; or parsing identification information in the data unit of the bitstream to be extracted, and parsing, for a recovery point, random access information included in the recovery point, where the identification information is used for indicating whether an access unit where the extracted sub-bitstream is located is the recovery point.

In addition, the embodiment may further include: means for parsing system layer information about the bitstream to be extracted, and acquiring the parameter information about the extractable sub-bitstream.

The apparatus for processing the video bitstream is provided in the embodiment of the present disclosure is aimed at the large access delay and the slow encoding and decoding speed in the existing art. The bitstream to be extracted is parsed, and the parameter information about the extractable sub-bitstream is acquired from the data unit of the bitstream to be extracted; the picture type parameter value of the random access picture in the sub-bitstream is determined according to the parameter information; and in the process of extracting the sub-bitstream from the bitstream to be extracted, the picture type parameter value is configured in the data unit of the sub-bitstream. Through the implementation of the present disclosure, the picture type parameter of the extracted sub-bitstream is configured with the picture type parameter value of the random access picture, thereby significantly improving the speed of the sub-bitstream extraction and the encoding and decoding speed.

Third Embodiment

The present embodiment describes a method for processing a video bitstream based on an H.265/HEVC standard.

An encoder using the H.265/HEVC standard may divide a video picture into a plurality of tiles, by configuring a tile boundary control condition, one or more tiles at a same location in each picture only use data within the one or more tiles in a same picture for an intra-frame prediction, and meanwhile only use data within the one or more tiles at the same location in other pictures for an inter-frame prediction during a decoding process. Although the one or more tiles do not have a directly explicitly corresponding data structure in an H.265/HEVC bitstream, but coded data (taking a network abstraction layer data unit as an example) corresponding to the one or more tiles may be extracted into one sub-bitstream. Decoding this sub-bitstream may acquire a restored picture of a picture region corresponding to the one or more tiles in an original picture. In the H.265/HEVC standard, the one or more tiles compose a motion-constrained tile set (MCTS).

The encoder using the H.265/HEVC standard may code auxiliary information about an MCTS for a video picture, the auxiliary information indicates the MCTS included in a coding picture for extracting the sub-bitstream. At the same time, the encoder may further continue to code auxiliary information used for guiding the bitstream extraction process for the MCTS. The encoder of the present embodiment may code in at least one of the auxiliary information about the MCTS and auxiliary information extracted by an MCTS sub-bitstream, whether a picture of a sub-bitstream acquired by extracting the MCTS is a random access picture. In a case where the picture of the sub-bitstream is the random access picture, type information about the random access picture is coded.

A device using the H.265/HEVC standard may configure random access picture information for the sub-bitstream in a process of extracting the MCTS sub-bitstream. Here, the device using the H.265/HEVC standard may be a terminal receiving device (e.g., a settop box, a television, a personal computer (PC), and a portable terminal, etc.), the device receives a bitstream generated by the encoder, a corresponding MCTS sub-bitstream is selected and extracted according to viewing requirements and selection requirements of a user, and the sub-bitstream is decoded to obtain a restored picture by using an H.265/HEVC decoder on the device. Alternatively, the device using the H.265/HEVC standard may further be a network intermediate device (e.g., a network router) of a data transmission network, where the device performs an MCTS extraction on a bitstream generated by the encoder of the present embodiment according to an acquired instruction (e.g., a viewing region selected by the user), and stores or transmits the extracted sub-bitstream. Alternatively, the device using the H.265/HEVC standard may further be a media data server, where the device performs the MCTS extraction on the bitstream generated by the encoder of the present embodiment to obtain one or more sub-bitstreams, so in a practical application, the device stores or transmits the extracted sub-bitstream according to the acquired instruction (e.g., the viewing region selected by the user). The extracted sub-bitstream may still continue to include an MCTS capable of performing the bitstream extraction, and the device using the H.265/HEVC standard may continue to configure auxiliary information required by the bitstream extraction for the such sub-bitstream, code the auxiliary information into an auxiliary information data unit and add it to the sub-bitstream.

An auxiliary information bitstream organization method used in the present embodiment is shown in table 1. The method carries information for indicating a random access point of the sub-bitstream in an auxiliary information unit for indicating an extraction of the MCTS sub-bitstream, and the information about the random access point may also include picture type information of the random access picture. The information for indicating the random access point of the sub-bitstream may also be carried in the auxiliary information unit indicating the MCTS information included in the bitstream by using the similar method.

TABLE 1

|  | Descriptor |
|---|---|
| mcts_extraction_info_sets( ) { | |
|   num_info_sets_minus1 | ue(v) |
|   for(i=0; i <=num_info_sets_minus1; i++ ) { | |
|     num_mcts_sets_minus1[i] | ue(v) |
|     random_access_info( ) | |
|     for( j = 0; j <= num_mcts_sets_minus1[i]; j++ ) { | |
|       num_mcts_in_set_minus1[i][j] | ue(v) |
|       for(k=0; k<=num_mcts_in_set_minus1[i][j];k++ ) | |
|         idx_of_mcts_in_set[i][j][k] | ue(v) |
|     } | |
|     ...... | |
|   } | |
| } | |

In table 1, random_access_info( ) is a data structure, which includes random access information of the extracted sub-bitstream. According to the method in table 1, a sub-bitstream is obtained by extracting the bitstream while using an extraction information set with an index serial number of i, and picture regions which compose the sub-bitstream and correspond to all MCTSs using the extraction information set with the index serial number of i have a same random access attribute. This random access attribute is used for indicating an attribute of the random access point, such as having a same picture type.

Alternatively, an auxiliary information bitstream organization method used in the embodiment may further be shown in table 2.

TABLE 2

|  | Descriptor |
|---|---|
| mcts_extraction_info_sets( ) { | |
|   num_info_sets_minus1 | ue(v) |
|   for( i=0; i<=num_info_sets_minus1; i++ ) { | |
|     num_mcts_sets_minus1[i] | ue(v) |
|     for( j=0; j<=num_mcts_sets_minus1[i]; j ++ ) { | |
|       num_mcts_in_set_minus1[i][j] | ue(v) |
|       random_access_info( ) | |
| for(k=0; k<=num_mcts_in_set_minus1[i][j]; k++ ) | |
|         idx_of_mcts_in_set[i][j][k] | ue(v) |
|     } | |
|     ...... | |
|   } | |
| } | |

In table 2, random_access_info( ) is a data structure, which includes the random access information of the extracted sub-bitstream. According to the method in table 2, a sub-bitstream is obtained by extracting the bitstream while using the extraction information set with the index serial number of i, and picture regions which compose the sub-bitstream and correspond to a $j^{th}$ MCTS using the extraction information set with the index serial number of i have a same random access attribute. This random access attribute is used for indicating an attribute of the random access point, such as having the same picture type. Different from the method in table 1 is that although the extraction information set with the index serial number of i is used, picture regions corresponding to the j$^{th}$ MCTS and a k$^{th}$ (k is not equal to j) MCTS may have different random access attributes. The method in table 2 adds flexibility to the process of generation and extraction of a coding bitstream.

Alternatively, an information organization method in the data structure of random_access_info( ) may be shown in table 3.

TABLE 3

| | Descriptor |
|---|---|
| random_access_info( ) { | |
| irap_flag | u(1) |
| } | |

In table 3, irap_flag indicates whether an access unit where a picture of the extracted sub-bitstream is located is a flag bit of an IRAP access unit. When a value of irap_flag is equal to 1, it is indicated that the access unit (AU) where the picture of the extracted sub-bitstream is located is the intra random access point (IRAP) AU, and the picture is an IRAP picture; and when the value of irap_flag is equal to 0, it is indicated that the AU where the picture of the extracted sub-bitstream is located is not an IRAP AU. irap_flag is processed using an entropy coding method corresponding to u(1) (on a bitstream generation device, such as an encoder) or an entropy decoding method (on a bitstream processing device, such as a decoder, a transcoder, and a bitstream extraction module).

Alternatively, an information organization method in the data structure of random_access_info( ) may further be shown in table 4.

TABLE 4

| | Descriptor |
|---|---|
| random_access_info( ) { | |
| irap_flag | u(1) |
| if ( irap_falg ) | |
| nal_unit_type_info | u(6) |
| } | |

In table 4, irap_flag indicates whether the access unit where the picture of the extracted sub-bitstream is located is the flag bit of the RAP access unit. For the TRAP access unit, a type of the RAP picture may be further configured. When the value of irap_flag is equal to 1, the AU where the picture of the extracted sub-bitstream is located is the RAP AU, and the picture is the IRAP picture. When the value of irap_flag is equal to 0, the AU where the picture of the extracted sub-bitstream is located is not an IRAP AU. irap_flag is processed using the entropy coding method corresponding to u(1) (on the bitstream generation device, such as an encoder) or the entropy decoding method (on the bitstream processing device, such as a decoder, a transcoder, and a bitstream extraction module). nal_unit_type_info indicates the type of the IRAP picture. The type of the IPAP picture may use a same type as the IRAP in an NAL unit type (indicated by nal_unit_type) defined by the H.265/HEVC standard, and the NAL unit type includes at least one of BLA_W_LP, BLA_W_RADL, BLA_N_LP, IDR_W_RADL, IDR_N_LP, or CRA_NUT. Alternatively, in addition to IRAP-related types in nal_unit_type, nal_unit_type_info may also include other types of the IRAP picture, such as a CRA-type IRAP picture, which may be further refined into CRA_W_LP, CRA_W_RADL, and CRA_N_LP, thus more information for configuring the picture type in the process of extracting the bitstream is provided. nal_unit_type_info is processed using the entropy coding method corresponding to u(6) (on the bitstream generation device, such as an encoder) or the entropy decoding method (on the bitstream processing device, such as a decoder, a transcoder, and a bitstream extraction module). It should be noted that in a case where values of nal_unit_type_info may have a number more than 64, more bits may be used for indicating nal_unit_type_info, such as u(7) (which may indicate 128 values), u(8) (which may indicate 256 values), and the like.

Alternatively, the information organization method in the data structure of random_access_info( ) may be shown in table 5.

TABLE 5

| | Descriptor |
|---|---|
| random_access_info( ) { | |
| nal_unit_type_info | u(6) |
| } | |

In table 5, nal_unit_type_info indicates the picture type of the picture in the AU where the picture of the extracted sub-bitstream is located. The type of the picture in the AU may be a picture type referred to the NAL unit type defined by the H.265/HEVC standard (indicated by using nal_unit_type), and the NAL unit type includes at least one of TRAIL_N, TRAIL_R, TSA_N, TSA_R, STSA_N, STSA_R, RADL_N, RADL_R, RASL_N, RASL_R, BLA_W_LP, BLA_W_RADL, BLA_N_LP, IDR_W_RADL, IDR_N_LP, or CRA_NUT, where when the picture type indicated by nal_unit_type_info is BLA_W_LP, BLA_W_RADL, BLA_N_LP, IDR_W_RADL, IDR_N_LP, or CRA_NUT, it is indicated that the picture included in the AU where the picture of the extracted sub-bitstream is located is an IRAP picture; on the contrary, when the picture type indicated by nal_unit_type_info is other type, it is indicated that the picture included in the AU where the picture of the extracted sub-bitstream is located is not an IRAP picture. nal_unit_type_info is processed using the entropy coding method corresponding to u(6) (on the bitstream generation device, such as an encoder) or the entropy decoding method (on the bitstream processing device, such as a decoder, a transcoder, and a bitstream extraction module). It should be noted that in a case where values of nal_unit_type_info may have a number more than 64, more bits may be used for indicating nal_unit_type_info, such as u(7) (which may indicate 128 values), u(8) (which may indicate 256 values), and the like.

When the auxiliary information bitstream organization method shown in table 1 is used, that is, the sub-bitstream obtained by extracting the bitstream while using the extraction information set with the index serial number of i and the picture region, which composes the sub-bitstream, corresponding to all MCTSs using the extraction information set with the index serial number of i have the same random access attribute. The implementation method using the auxiliary information bitstream organization method shown in table 2 is similar to the implementation method in table 1, and the difference is that although the extraction information set with the index serial number of number i is used, the picture regions corresponding to the j$^{th}$ MCTS and the k$^{th}$ (k is not equal to j) MCTS may have different random access attributes. However, when the sub-bitstream extraction is performed on the bitstream by using the implementation method in table 1 or in table 2, it is necessary to determine a random access attribute of a picture region corresponding to an extracted target MCTS.

Figure 3:
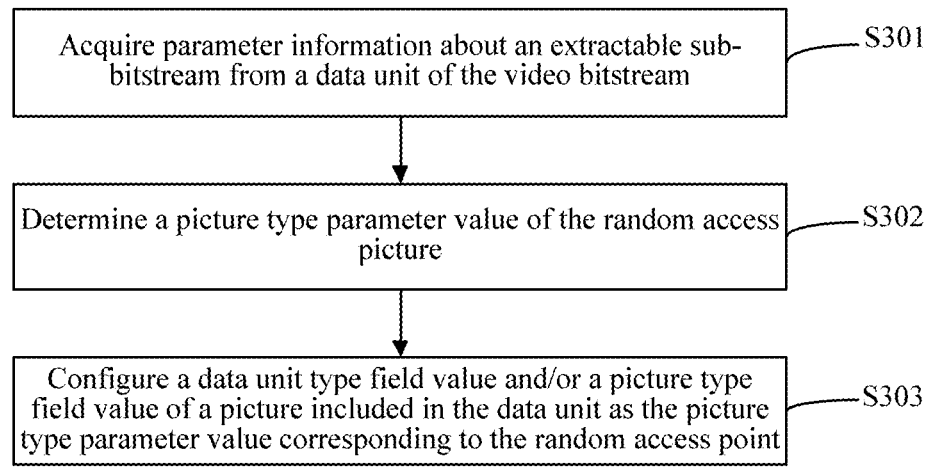
FIG. 3 is a flowchart of a method for processing a video bitstream according to a third embodiment of the present disclosure.

Referring to FIG. 3, the method for processing the video bitstream in the present embodiment will be described below by taking table 1 as an example.

In step S301, an H.265/HEVC video bitstream is parsed, and parameter information about an extractable sub-bitstream is acquired from a data unit of the video bitstream.

Exemplarily, MCTS division information of the picture in the AU may be obtained from a temporal motion-constrained tile sets SEI message by parsing an SEI message unit included in the AU, and auxiliary information of sub-bitstreams corresponding to extracted different MCTSs may be obtained from the SEI information extracted by the MCTS shown in table 1 and random access information of a sub-bitstream corresponding to each MCTS may be obtained.

In step S302, when a value of the identification field in the parameter information indicates that a picture in the sub-bitstream is a picture corresponding to a random access point, a picture type parameter value of the random access picture is determined.

When the organization method in table 3 is used, and the value of irap_flag is equal to 1, it is indicated that the picture in the sub-bitstream is the picture corresponding to the random access point. For the picture corresponding to the random access point, the picture type of the random access picture is determined according to following properties of subsequent pictures of the sub-bitstream in a decoding sequence.

According to the decoding sequence of pictures, if each decoded picture after the random access picture in the sub-bitstream has a broadcasting sequence after the random access picture, then it is determined that the random access picture does not carry a leading picture (LP); on the contrary, it is determined that an LP accompanying with the random access picture exists.

When the LP accompanying with the random access picture exists, and decoding processes of all LP pictures do not refer to pictures before this random access picture according to the decoding sequence, it is determined that in the sub-bitstream, when a random access is performed on the random access picture, the LP picture accompanying with the random access picture may be correctly decoded; on the contrary, the LP accompanying with the random access picture does not exist, when the random access is performed on the random access picture, the LP picture accompanying with the random access picture cannot be correctly decoded. It should be noted that in a case where the number of LP pictures is one or more, it does not mean that all of the LP pictures cannot be correctly decoded.

A type of the random access picture consistent with the above-mentioned properties is selected as the type of the random access picture according to a value of a picture order count (POC) corresponding to the random access picture, a state and an operation of a decoded picture buffer (DPB) (e.g. whether the DPB may be cleared), whether a reference picture set needs to be declared in the sub-bitstream, and the like, and an optional picture type is a type of the random access picture defined by the H.265/HEVC standard, where the type of the random access picture defined by the H.265/HEVC standard includes an instantaneous decoding refresh (IDR) type, a broken link access (BLA) type and a clean random access (CRA) type. For example, if it is determined that the value of POC corresponding to the random access picture is equal to 0, and all pictures in the DPB do not need to be a decoding reference picture of all pictures after the random access picture according to the decoding sequence, the type of the random access picture may be configured as the IDR type. At the same time, a picture type corresponding to nal_unit_type in NAL unit header information about the random access picture type is configured in combination with above determinations including whether the random access picture has an accompanying LP picture and whether the decoding process of the LP picture needs to refer to pictures before the random access picture according to the decoding sequence when the LP picture exists. nal_unit_type is defined by the H.265/HEVC standard. For the above-mentioned examples, if the random access picture has no accompanying LP picture, the picture type corresponding to nal_unit_type in the NAL unit header information is configured as IDR_N_LP; if the random access picture has the accompanying LP picture and the decoding of the LP picture does not need to refer to the pictures before the random access picture according to the decoding sequence, the picture type corresponding to nal_unit_type in the NAL unit header information about the random access picture is configured as IDR_W_RADL; and if the random access picture has the accompanying LP picture, and the decoding of the LP picture needs to refer to the pictures before the random access picture according to the decoding sequence, the type of the random access picture is changed from IDR to BLA, and the picture type corresponding to nal_unit_type in the NAL unit header information is configured as BLA_W_LP.

Alternatively, when the organization method in table 4 is used, and the value of irap_flag is equal to 1, it is indicated that the picture in the sub-bitstream is the picture corresponding to the random access point. nal_unit_type_info is parsed to acquire the picture type corresponding to nal_unit_type in the NAL unit header information about the random access picture. Compared to the method using table 3, in the method using table 4, the bitstream processing device does not need to judge and determine the type of the random access picture according to a condition of the sub-bitstream, but the bitstream generation device needs to determine the type of the random access picture in the sub-bitstream for the sub-bitstream extraction process of the bitstream processing device, and configure a value of the information field nal_unit_type_info in table 4.

Alternatively, when the organization method in table 5 is used, nal_unit_type_info is directly parsed to acquire a picture type of a picture in a sub-bitstream corresponding to an MCTS corresponding picture region in a sub-bitstream which corresponds to an MCTS in the AU where the SEI information about this field is located. When the picture type of the picture indicated by the value corresponding to nal_unit_type_info is BLA_W_LP, BLA_W_RADL, BLA_N_LP, IDR_W_RADL, IDR_N_LP, or CRA_NUT, it is indicated that a picture included in the AU where the picture of the extracted sub-bitstream is located is an IRAP picture; and when the picture type of the picture indicated by the value corresponding to nal_unit_type_info is TRAIL_N, TRAIL_R, TSA_N, TSA_R, STSA_N, STSA_R, RADL_N, RADL_R, RASL_N and RASL_R, it is indicated that the picture included in the AU where the picture of the extracted sub-bitstream is located is not an IRAP picture. The picture type corresponding to nal_unit_type in the NAL unit header information about the picture may be directly set by parsing the picture type indicated by nal_unit_type_info. The method using table 5 is similar to the method using table 4, and compared to the method using table 3, through the method using table 5, the bitstream processing device does not need to judge and determine the type of the random access picture according to the condition of the sub-bitstream, but the bitstream generation device needs to determine the type of the random access picture in the sub-bitstream for the sub-bitstream extraction process of the bitstream processing device, and configure the value of the information field nal_unit_type_info in table 5.

In step S303, in the process of extracting the sub-bitstream, a data unit type field value in the data unit included in the sub-bitstream and/or a picture type field value of a picture included in the data unit are/is configured as the picture type parameter value corresponding to the random access point.

When table 3 or table 4 is used in step S302, and the picture of the sub-bitstream is the random access picture, step S302 determines the type of the random access picture. For the NAL unit corresponding to the random access picture in the sub-bitstream, a value of a nal_unit_type field in the NAL unit is rewritten to a value corresponding to the picture type determined in step S302.

Alternatively, when table 5 is used in step S302, step S302 may acquire the picture type of the random access picture and a picture type of a non-random access picture. In this case, the value of the nal_unit_type field in the NAL unit in the picture of the sub-bitstream is rewritten to the value corresponding to the picture type determined in step S302.

In an embodiment, step S303 may further continue to determine whether a value of a slice type field in picture slice header information of the sub-bitstream conforms to a picture type identified by the nal_unit_type field. For example, when a value of sps_curr_pic_ref_enabled_flag field is equal to 0 or this field does not exist, for the random access picture, an indication corresponding to the value of the slice_type field in the slice header information is "I". Step S303 may further perform a conformance check on the sub-bitstream to determine whether the sub-bitstream conforms to the declared profile, tier and level in the H.265/HEVC standard, and rewrite a non-conforming field in the bitstream according to the H.265/HEVC standard. Step S303 may refine and rewrite a corresponding field in the bitstream, such as nal_unti_type of a non-random access picture, reference picture set (RPS) information of a picture, etc., according to features such as a prediction structure among pictures in the sub-bitstream. For example, before the sub-bitstream is extracted, nal_unit_type of the picture indicates that the picture will be used as a reference picture, and after the sub-bitstream is extracted, a picture composed by a part of regions of the picture included in the sub-bitstream will not be used as a reference picture of other pictures in the sub-bitstream. At the moment, step S303 may rewrite nal_unit_type of the picture in the sub-bitstream to a value indicating that the picture is not used as the reference picture, or may continue to correspondingly adjust the RPS information of the picture at the same time.

Before step S301 is executed, before step S302 is executed, or before step S303 is executed, it is necessary to determine the extracted sub-bitstream. A selection of the sub-bitstream is determined according to application requirements. For example, for a media server, sub-bitstreams need to be respectively extracted for different viewing regions, which are used for transmitting a corresponding sub-bitstream according to a viewing selection of the user. For a terminal device, when a complete bitstream or sub-bitstream is acquired, the complete bitstream or sub-bitstream may be extracted according to a viewing region selected by the user, and the extracted bitstream may be decoded and broadcasted. It should be noted that the extracted sub-bitstream may be a bitstream that may not be further extracted or may continue to be further extracted, for example, the sub-bitstream further includes one or more MCTSs for an extraction. For the latter case, in step S203, additional auxiliary information may be further configured for the sub-bitstream, for example, MCTS information and values of corresponding fields in tables 1 to 5 may be re-configured for the sub-bitstream to facilitate a further extraction of this sub-bitstream in a subsequent bitstream processing process.

For the extracted sub-bitstream, except indicating the picture type of the random access picture (and the picture type of the non-random access (e.g., using table 5)) by using nal_unit_type as described above, in a process of executing step S303, an SEI message of a recovery point may be configured for the sub-bitstream according to the picture type, and the SEI message may be written into the AU of a picture corresponding to a related random access picture or a bitstream random access point.

Fourth Embodiment

This embodiment describes a method for processing a video bitstream based on the H.26/AVC standard.

A device using the H.264/AVC standard may use a slice group to implement a function similar to tiles of the third embodiment, that is, a video picture is divided into a plurality of slice groups. By configuring boundary control conditions of the slice groups, one or more slice groups at a same location in each picture only use data within the one or more slice groups in a same picture for an intra-frame prediction, and at the same time only use data within the one or more slice groups at a same location in other pictures for an inter-frame prediction in a decoding process. Coding data (taking an NAL data unit (NAL unit) as an example) corresponding to the one or more slice groups may be extracted into one sub-bitstream. Decoding this sub-bitstream may acquire a restored picture of a picture region corresponding to the one or more slice groups in an original picture. In the H.264/AVC standard, the one or more slice groups may compose a motion constrained slice group set.

Accordingly, a sub-bitstream extraction may be performed on an H.264/AVC bitstream, and it is determined whether a picture composed in the sub-bitstream and by a picture region corresponding to the motion constrained slice group set is a random access picture and a type of this random access picture, at the same time, a picture type in the extracted sub-bitstream and a bitstream field related thereto are rewritten.

In an execution procedure, the difference from the third embodiment is that the H.264/AVC standard only defines an IDR picture without a BLA picture and CRA picture. Therefore, in NAL unit header information, only when a value of nal_unit_type is equal to 5, this field clearly indicates that the NAL unit carries coding data of the IDR picture, and the IDR picture may be used as the random access picture. In this way, when it is determined that the type of the random access picture of the picture in the sub-bitstream is IDR_W_RADL or IDR_N_LP, in the present embodiment, the picture type defined by the H.264/AVC standard may be clearly corresponded to the IDR picture, i.e., in a process of executing the step S203, the value of the nal_unit_type field in the NAL data unit of the random access picture in the sub-bitstream is rewritten to 5. In other cases, for a picture of the sub-bitstream, the value of the nal_unit_type field needs to be configured as 1; and for the random access picture implemented by using a non-IDR picture, the random access picture may be indicated by using an SEI message of a recovery point. In the process of executing the step S203, the SEI message of the recovery point needs to be written into an AU in the sub-bitstream and corresponding to the non-IDR picture. In the process of executing the step S203, a field in the slice header information, which is related to the picture type and/or the SEI message of the recovery point, needs to be rewritten according to the H.264/AVC standard, for example, a slice_type field is rewritten in a manner similar to that of the third embodiment.

In the present embodiment, after the sub-bitstream extraction is performed on the H.264/AVC bitstream, the acquired sub-bitstream may not be able to continue to perform a sub-bitstream extraction, or may be able to continue to perform the sub-bitstream extraction. In a case where the sub-bitstream extraction may be continued, a new motion constrained slice group sets SEI message and an SEI message similar to the picture type information of the random access picture in the third embodiment may be generated for the sub-bitstream when the sub-bitstream extraction is performed, and these SEI messages may be added into the sub-bitstream. For example, these SEI messages are added into the AU where the random access picture of the sub-bitstream is located, so as to facilitate an efficient extraction of the sub-bitstream.

Fifth Embodiment

The methods in the above-mentioned embodiments are to extract a video bitstream by using auxiliary information of a video elementary stream in the bitstream to be extracted. In an auxiliary information organization method for the sub-bitstream extraction similar to the video elementary stream, a bitstream generation device may code the auxiliary information on a system layer, for example, in information units such as a descriptor of a transport stream, a data unit in a file format (e.g., in a box), media description information of the transport stream (e.g., a media presentation description (MPD)), and the like.

In the present embodiment, after the system layer acquires the auxiliary information about the sub-bitstream extraction, a sub-stream extraction operation may be performed by selecting the methods in the above-mentioned embodiments according to the standard (e.g., H.265/HEVC standard and H.264/AVC standard) used by the video bitstream carried by the system layer.

In the present embodiment, in a process of extracting the sub-bitstream, the auxiliary information may be extracted according to the sub-bitstream of the system layer, and the auxiliary information of the extracted sub-bitstream may be generated for the extracted video sub-bitstream. Alternatively, the auxiliary information may be added into the video elementary stream by using the method of the third embodiment or the fourth embodiment in a manner of an SEI message unit, and then the video elementary stream is subjected to a system layer encapsulation processing. At the same time, alternatively, the auxiliary information may be added into a system layer bitstream in a process of performing the system layer encapsulation processing on the video elementary stream in a manner of system layer auxiliary information.

In the bitstream extraction process of the system layer, according to a condition of a random access picture in the sub-bitstream of the video elementary stream, the system layer correspondingly configures or rewrites a value of a system layer field already existed in the system layer and related to the random access picture and/or a stream access point (SAP) in a process of performing the system layer encapsulation processing on the sub-bitstream.

Sixth Embodiment

Figure 4:
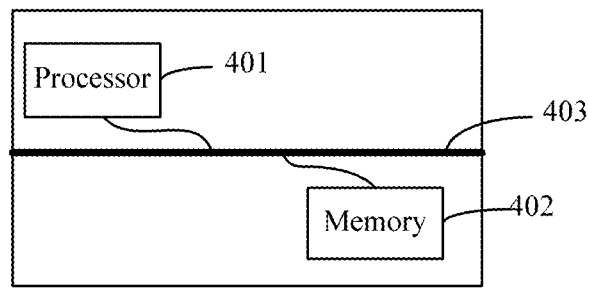
FIG. 4 is a schematic diagram illustrating composition of a network device according to a sixth embodiment of the present disclosure.

Referring to FIG. 4, FIG. 4 is a schematic diagram illustrating composition of a network device according to the sixth embodiment of the present disclosure. The network device includes a processor 401, a memory 402 and a communication bus 403. The communication bus 403 is configured to implement a connection communication between the processor 401 and the memory 402; and the processor 401 is configured to execute programs for processing a video bitstream, which are stored in the memory 402, to perform steps of the above-mentioned method for processing the video bitstream in each embodiment.

Exemplarily, the network device in the present embodiment may perform a sub-bitstream extraction by using the method of the first embodiment or perform the sub-bitstream extraction in combination with methods of the fifth embodiment and the first embodiment.

Exemplarily, the network device may perform the sub-bitstream extraction by using the method of the third embodiment or perform the sub-bitstream extraction in combination with methods of the fifth embodiment and the third embodiment on a media bitstream or media file using the H.265/HEVC standard.

Exemplarily, the network device may perform the sub-bitstream extraction by using the method of the fourth embodiment or perform the sub-bitstream extraction in combination with method of the fifth embodiment and the fourth embodiment on a media bitstream or media file using an H.264/AVC standard.

The network device in the present embodiment may be a related bitstream generation device and receiving playing device in a video communication application and may include at least one of a terminal receiving device, a network intermediate device or a media data server, where the terminal receiving device may include a mobile phone, a computer, a portable mobile terminal, a settop box and a digital video camera, the network intermediate device may include a network router and the like, and the media data server may include a server, a television broadcast system device, a content distribution network device, a media server, and the like.

The embodiments of the present disclosure further provide a computer-readable storage medium. The computer-readable storage medium is configured to store one or more computer programs, where the one or more computer programs are executable by one or more processors to implement the above-mentioned methods for processing the video bitstream, and hence, which will not be repeated herein.

Apparently, it should be understood by those skilled in the art that each of the modules or steps in the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage medium (such as a read-only memory (ROM)/random access memory (RAM), a magnetic disk or an optical disk) and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present disclosure is not limited to any combination of hardware and software.

The above contents are further detailed descriptions of the present disclosure in conjunction with the embodiments, and the implementation of the present disclosure is not limited to the description. For those skilled in the art to which the present disclosure pertains, a number of simple deductions or substitutions may be made without departing from the concept of the present disclosure and should fall within the protection scope of the present disclosure.

What is claimed is:

1. A method for processing a video bitstream, comprising:
parsing a bitstream to be extracted, and acquiring parameter information about an extractable sub-bitstream from a data unit of the bitstream to be extracted;
determining a picture type parameter value of a random access picture in the sub-bitstream according to the parameter information; and
configuring, in a process of extracting the sub-bitstream from the bitstream to be extracted, a picture type parameter value in a data unit of the sub-bitstream according to the picture type parameter value of the random access picture;
wherein determining the picture type parameter value of the random access picture in the sub-bitstream comprises at least one of:
in a case where the parameter information comprises picture type information of the random access picture in the sub-bitstream, serving a value of the picture type information as the picture type parameter value of the random access picture;
in a case where the parameter information comprises information about an access point related to a random access, determining a picture type parameter value of a picture corresponding to the access point, and serving the picture type parameter value of the picture corresponding to the access point as the picture type parameter value of the random access picture; or
in a case where the parameter information comprises information about a random access picture location, determining, according to a bitstream feature of the sub-bitstream at the random access picture location, picture type information of the random access picture, and serving a value of the picture type information of the random access picture as the picture type parameter value of the random access picture.

2. The method of claim 1, wherein in the case where the parameter information comprises the information about the access point related to the random access, determining the picture type parameter value of the picture corresponding to the access point comprises:
in a case where the information about the access point comprises picture type information, serving a value of the picture type information as the picture type parameter value of the picture corresponding to the access point;
in a case where the information about the access point does not comprise the picture type information, analyzing a bitstream feature of the sub-bitstream at a location of the access point, determining picture type information of the picture corresponding to the access point, and serving a value of the picture type information of the picture corresponding to the access point as the picture type parameter value of the picture corresponding to the access point.

3. The method of claim 2, wherein the access point is a recovery point.

4. The method of claim 3, wherein configuring the picture type parameter value in the data unit of the sub-bitstream comprises:
configuring at least one of a data unit type field value in the data unit comprised in the sub-bitstream or a picture type field value of a picture comprised in the data unit as the picture type parameter value in the data unit of the sub-bitstream.

5. The method of claim 2, wherein configuring the picture type parameter value in the data unit of the sub-bitstream comprises:
configuring at least one of a data unit type field value in the data unit comprised in the sub-bitstream or a picture type field value of a picture comprised in the data unit as the picture type parameter value in the data unit of the sub-bitstream.

6. The method of claim 1, wherein the data unit comprises at least one of: a network abstraction layer unit header, a parameter set, a sequence header, a picture header, a slice header, an auxiliary information unit of the video bitstream or video usability information.

7. The method of claim 6, wherein configuring the picture type parameter value in the data unit of the sub-bitstream comprises:
configuring at least one of a data unit type field value in the data unit comprised in the sub-bitstream or a picture type field value of a picture comprised in the data unit as the picture type parameter value in the data unit of the sub-bitstream.

8. The method of claim 1, further comprising:
configuring, in the data unit of the sub-bitstream, parameter information for performing a bitstream extraction on the sub-bitstream.

9. The method of claim 8, wherein configuring the picture type parameter value in the data unit of the sub-bitstream comprises:
configuring at least one of a data unit type field value in the data unit comprised in the sub-bitstream or a picture type field value of a picture comprised in the data unit as the picture type parameter value in the data unit of the sub-bitstream.

10. The method of claim 1, wherein configuring the picture type parameter value in the data unit of the sub-bitstream comprises:
configuring at least one of a data unit type field value in the data unit comprised in the sub-bitstream or a picture type field value of a picture comprised in the data unit as the picture type parameter value in the data unit of the sub-bitstream.

11. The method of claim 1, wherein the parameter information about the extractable sub-bitstream is acquired from the data unit of the bitstream to be extracted by using an H.265/high efficiency video coding (HEVC) standard and at least one of following manners:
parsing an extraction information set with an index serial number of i in the data unit of the bitstream to be extracted, and configuring pictures for composing the sub-bitstream in bitstream extraction, which are in the sub-bitstream and composed by picture regions corresponding to motion-constrained tile sets using the extraction information set with the index serial number of i, to have a same picture type;

parsing an extraction information set with an index serial number of i in the data unit of the bitstream to be extracted, and configuring pictures for composing the sub-bitstream in bitstream extraction, which are in the sub-bitstream and composed by picture regions corresponding to a jth motion-constrained tile set using the extraction information set with the index serial number of i, to have a same picture type;

parsing identification information in the data unit of the bitstream to be extracted, and configuring a picture type corresponding to an intra random access point (IRAP) access unit as an IRAP picture, wherein the identification information is used for indicating whether an access unit where a picture of the extracted sub-bitstream is located is the IRAP access unit;

parsing the identification information in the data unit of the bitstream to be extracted, and parsing, for an IRAP access unit, an IRAP picture type comprised in the TRAP access unit, wherein the identification information is used for indicating whether an access unit where a picture of the extracted sub-bitstream is located is the IRAP access unit;

parsing a picture type in the data unit of the bitstream to be extracted, wherein the picture type is used for indicating a picture in an access unit where a picture of the extracted sub-bitstream is located; or parsing identification information in the data unit of the bitstream to be extracted, and parsing, for a recovery point, random access information comprised in the recovery point, wherein the identification information is used for indicating whether an access unit where the extracted sub-bitstream is located is the recovery point.

12. The method of claim 1, wherein the parameter information about the extractable sub-bitstream is acquired from the data unit of the bitstream to be extracted by using an H.264/advanced video coding (AVC) standard and at least one of following manners:

parsing an extraction information set with an index serial number of i in the data unit of the bitstream to be extracted, and configuring pictures for composing the sub-bitstream in bitstream extraction, which are in the sub-bitstream and composed by picture regions corresponding to motion constrained slice group sets using the extraction information set with the index serial number of i, to have a same picture type;

parsing an extraction information set with an index serial number of i in the data unit of the bitstream to be extracted, and configuring pictures for composing the sub-bitstream in bitstream extraction, which are in the sub-bitstream and composed by picture regions corresponding to a jth motion constrained slice group set using the extraction information set with the index serial number of i, to have a same picture type;

parsing identification information in the data unit of the bitstream to be extracted, wherein the identification information is used for indicating whether a picture of the extracted sub-bitstream is an instantaneous decoding refresh (IDR) picture; or parsing identification information in the data unit of the bitstream to be extracted, and parsing, for a recovery point, random access information comprised in the recovery point, wherein the identification information is used for indicating whether an access unit where the extracted sub-bitstream is located is the recovery point.

13. The method of claim 1, further comprising:
parsing system layer information of the bitstream to be extracted, and acquiring the parameter information about the extractable sub-bitstream.

14. A network device, comprising a processor, a memory and a communication bus;
wherein
the communication bus is configured to implement a connection communication between the processor and the memory; and
the processor is configured to execute programs for processing a video bitstream, which are stored in the memory, to perform the method for processing the video bitstream of claim 1.

15. The network device of claim 14, comprising at least one of a terminal receiving device, a network intermediate device or a media data server.

16. A non-transitory computer-readable storage medium, configured to store at least one computer program, wherein the at least one computer program is executable by at least one processor to implement the method for processing the video bitstream of claim 1.

17. An apparatus for processing a video bitstream, comprising:
a bitstream parsing module, which is configured to parse a bitstream to be extracted, and acquire parameter information about an extractable sub-bitstream from a data unit of the bitstream to be extracted;
a parameter determination module, which is configured to determine a picture type parameter value of a random access picture in the sub-bitstream according to the parameter information; and
a parameter configuration module, which is configured to configure, in a process of extracting the sub-bitstream from the bitstream to be extracted, a picture type parameter value in a data unit of the sub-bitstream according to the picture type parameter value of the random access picture;
wherein the picture type parameter value of the random access picture in the sub-bitstream is determined in at least one of following manners:
in a case where the parameter information comprises picture type information of the random access picture in the sub-bitstream, serving a value of the picture type information as the picture type parameter value of the random access picture;
in a case where the parameter information comprises information about an available access point related to a random access, determining a picture type parameter value of a picture corresponding to the access point, and serving the picture type parameter value of the picture corresponding to the access point as the picture type parameter value of the random access picture; or
in a case where the parameter information comprises information about a random access picture location, determining, according to a bitstream feature of the sub-bitstream at the random access picture location, picture type information of the random access picture, and serving a value of the picture type information of the random access picture as the picture type parameter value of the random access picture.

18. The apparatus of claim 17, further comprising a parameter preset module, which is configured to configure, in the data unit of the sub-bitstream, parameter information for performing bitstream extraction on the sub-bitstream.

* * * * *

UNITED STATES PATENT AND TRADEMARK OFFICE
CERTIFICATE OF CORRECTION

PATENT NO. : 11,336,965 B2
APPLICATION NO. : 16/958644
DATED : May 17, 2022
INVENTOR(S) : Li et al.

It is certified that error appears in the above-identified patent and that said Letters Patent is hereby corrected as shown below:

In the Specification

In Column 4, Line 28, delete "(SEI))" and insert --(SEI)--.

In Column 4, Line 28, delete "(VUI))" and insert --(VUI)--.

In Column 7, Line 16 (Approx.), delete "(RAP)" and insert --(IRAP)--.

In Column 7, Line 17 (Approx.), delete "RAP" and insert --IRAP--.

In Column 7, Line 19 (Approx.), delete "TRAP" and insert --IRAP--.

In Column 7, Line 21 (Approx.), delete "TRAP" and insert --IRAP--.

In Column 7, Line 22 (Approx.), delete "RAP" and insert --IRAP--.

In Column 7, Line 22 (Approx.), delete "TRAP" and insert --IRAP--.

In Column 7, Line 25 (Approx.), delete "TRAP" and insert --IRAP--.

In Column 11, Line 7, delete "cbitstream," and insert --bitstream,--.

In Column 11, Line 64, delete "RAP" and insert --IRAP--.

In Column 15, Line 39, delete "falg )" and insert --flag )--.

In Column 15, Line 45, delete "RAP" and insert --IRAP--.

In Column 15, Line 45, delete "TRAP" and insert --IRAP--.

Signed and Sealed this
Fifth Day of September, 2023

Katherine Kelly Vidal
*Director of the United States Patent and Trademark Office*

In Column 15, Line 46, delete "RAP" and insert --IRAP--.

In Column 15, Line 48, delete "RAP" and insert --IRAP--.

In Column 15, Line 57, delete "IPAP" and insert --IRAP--.

In Column 19, Line 41, delete "unti" and insert --unit--.

In Column 20, Line 24, delete "H.26/AVC" and insert --H.264/AVC--.